United States Patent
Nair et al.

(10) Patent No.: US 11,341,168 B2
(45) Date of Patent: May 24, 2022

(54) SYSTEM AND METHOD FOR CONTROLLING AND DETERMINING QUALITY OF ACTIVITY DURATION KEYS

(71) Applicant: ORACLE INTERNATIONAL CORPORATION, Redwood Shores, CA (US)

(72) Inventors: Prasad Nair, Thiruvananthapuram (IN); Oleksiy Turchyn, Cleveland, OH (US); Michael Wierzbowski, Gainesville, FL (US); Dmytro Buldakov, Shaker Heights, OH (US); Tetiana Gladkykh, Kharkov (UA)

(73) Assignee: Oracle International Corporation, Redwood Shores, CA (US)

( * ) Notice: Subject to any disclaimer, the term of this patent is extended or adjusted under 35 U.S.C. 154(b) by 490 days.

(21) Appl. No.: 16/357,665

(22) Filed: Mar. 19, 2019

(65) Prior Publication Data

US 2020/0250205 A1    Aug. 6, 2020

Related U.S. Application Data

(60) Provisional application No. 62/800,270, filed on Feb. 1, 2019.

(51) Int. Cl.
*G06F 16/28* (2019.01)
*G06Q 10/06* (2012.01)
*G06F 16/2457* (2019.01)

(52) U.S. Cl.
CPC ...... *G06F 16/285* (2019.01); *G06F 16/24575* (2019.01); *G06Q 10/06311* (2013.01)

(58) Field of Classification Search
None
See application file for complete search history.

(56) References Cited

U.S. PATENT DOCUMENTS

| | | | | |
|---|---|---|---|---|
| 2002/0188677 A1* | 12/2002 | Brady | ..... | G06Q 30/02 709/203 |
| 2014/0280952 A1* | 9/2014 | Shear | ..... | H04L 63/10 709/226 |
| 2015/0058324 A1* | 2/2015 | Kauwe | ..... | G06F 16/284 707/722 |
| 2016/0232799 A1 | 8/2016 | Bartle et al. | | |

OTHER PUBLICATIONS

Oracle; Getting Started with Activity Types, pp. 1-12, downloaded on Dec. 13, 2019 from: https://learn.oracle.com/ords/launchpad/learn?page=getting-started-with-activity-types&context=0:49713:49735.

* cited by examiner

*Primary Examiner* — Amresh Singh
(74) *Attorney, Agent, or Firm* — Kraguljac Law Group, LLC (57) ABSTRACT

Systems, methods, and other embodiments associated with determining a quality for activity duration keys are described. In one embodiment, a method includes comparing a duration time of an activity duration key to each reported time duration for completing selected activities from activity records and determining a difference associated to each activity record. A quality value is assigned to each activity record based on the difference, wherein the quality value represents one of at least two values indicative of a good value or a bad value. The quality of the activity duration key is calculated based at least on a number of the activity records that were assigned the good value relative to a number of the activity records assigned the bad value.

20 Claims, 3 Drawing Sheets

SYSTEM AND METHOD FOR CONTROLLING AND DETERMINING QUALITY OF ACTIVITY DURATION KEYS

CROSS REFERENCE TO RELATED APPLICATIONS

This disclosure claims the benefit of U.S. Provisional Patent Application Ser. No. 62/800,270 filed Feb. 1, 2019, titled "System and Method for Controlling and Determining Quality of Activity Duration Keys", which is incorporated by reference herein in its entirety.

BACKGROUND

Estimating activity durations is one part of project management. It involves an estimation of the amount of time required by a certain project activity given available resources. Activity duration keys have been used to accurately estimate durations of future activities. One problem is that there is no good way for customers to know how good or accurate the activity duration key is.

Estimating activity durations is one part of project management. It involves an estimation of the amount of time required by a certain project activity given available resources. To learn activity duration, it is required to categorize activities, by learning which groups are similar, assuming that activities within each of the groups are similar by nature, and have a similar volume of work. Therefore these types of activities should have a similar time duration. The duration estimation involves a high volume of input and output data, and also the estimation accuracy provided by one or another grouping method changes over time after more data is gathered. Therefore one problem is that there is no good way for customers to know how good or accurate time durations and/or grouping approaches are compared to other possible time durations and/or grouping approaches.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Computer-implemented systems and methods are described herein that control Activity Duration Keys and automatically compute qualities of Activity Duration Keys based on how accurately each configured key estimates a time duration for different types of activities. In one embodiment, the quality of a duration key is higher/better (more accurate) if a difference between an estimated duration of an activity and a reported duration of the activity is smaller and vice versa. In one embodiment, the activity duration key is used as a grouping technique to group similar activities together based on similar properties. Thus the quality of the duration key is also affected by how well the duration key groups activities as being similar. However, the present system and method is applicable to other grouping techniques that can be used to identify activities as being similar and group the similar activities.

The computation of the qualities of all configured keys (irrespective of whether they were active or not) provides a clear determination on how accurate each configured key is, which previous systems could not do. The system can then identify and select the most accurate key for each type of activity. The selected key for each activity may then be transmitted to customers allowing the customers to make an informed decisions (backed by data) on which key should be used for activity duration estimations in subsequent calculations. Implementing an accurate key (as identified and recommended) that replaces an inaccurate key will cause a reduction is errors in future time estimation calculations by the system.

In order to facilitate grouping of activities that are similar in nature, for duration calculation purposes, an activity duration key can be defined and configured. In one embodiment, the activity duration key may be configured via a graphical user interface by an administrator. The activity duration key is defined with a configuration or formula, which is a selected combination of one or more properties associated with each activity. Based on values of the properties that make up the key, activities that have properties that match the key are identified as similar activities and are grouped together. This is further described with reference to FIG. 2. Durations of completed activities that fall under the same group are used to estimate the duration of future activities.

Configuring an appropriate activity duration key determines the accuracy in estimating durations of future activities. A problem is that previously there was no way for customers to know how good the configured key was. Customers have no way to identify if an active key was the most effective one or if multiple keys should be configured to perform a "what if" analysis using production data.

Prior systems and techniques did not provide a way to determine how accurate or inaccurate a configured key was. In one embodiment, the present system performs learning and analysis on duration keys, and provides an ability to determine key quality when multiple keys are configured. Without the present system and method, customers would continue to use a configured key (that was configured based on a gut feeling rather than backed up by any data) even if key produces sub-par estimations, since previously there was no good way to compare the performances of different keys.

How a duration key is configured and how a key generates an estimated time duration for an activity is not the focus of this disclosure. The present systems and methods involve determining a quality of a duration key that has been configured and identifying the most accurate duration key from a group of keys. Inaccurate keys are also identified in the process as compared to other duration keys.

In one embodiment, a graphical user interface is configured and generated that displays a group of configured activity keys that are available to the system. The GUI allows for the selection and/or changing of an "active" key. The "active" key is one key from the group of keys that is selected to be used in estimating durations of activities. A key quality analysis is executed on the activity keys to determine a quality value for each key (as described below). The GUI provides a visual comparison of different keys making it easier to visually see the quality of the different keys. The GUI also provides information about the potential impact of a key before the key is activated for estimating future time durations for an activity.

Figure 1:
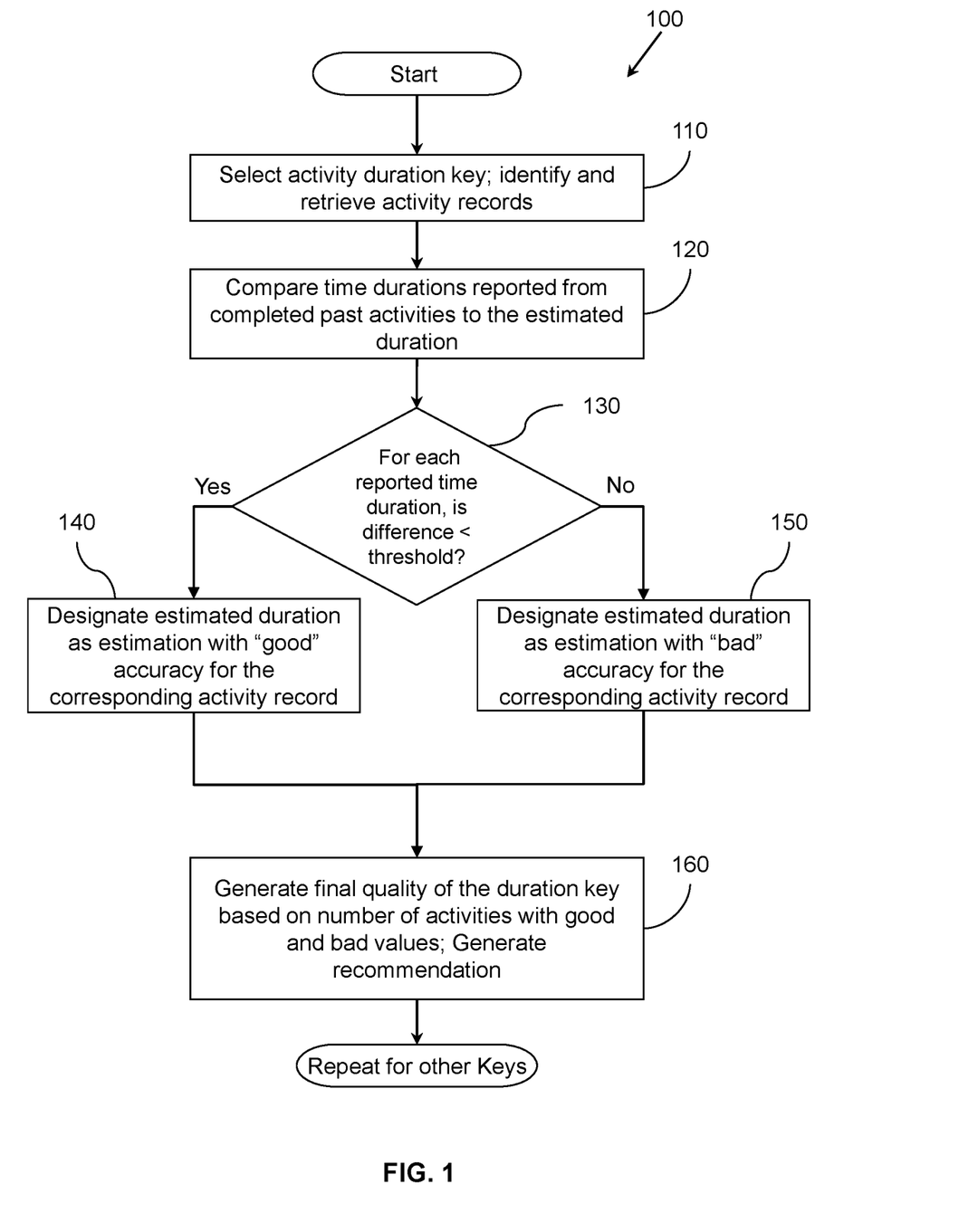
FIG. 1 illustrates one embodiment of a method associated a systematic determination of quality for duration keys.

With reference to FIG. 1, a computer-implemented method 100 is illustrated that describes one embodiment for determining qualities of activity duration keys. The method 100 is performed by at least a processor of a computer system that accesses and interacts with memories and/or data storage devices. For example, the processor accesses and reads/writes data to the memory to perform the actions of FIG. 1.

Method 100 executes with a presumption that one or more activity duration keys have been configured and are stored in a data structure (e.g., a data record(s)). Also, one or more data records (activity records) should exist that contain data for specified activities that were performed in the past.

For example, for an activity type 1, there may be ten (10) activity records that indicate that the activity was performed ten (10) times, one record per occurrence of the activity. Each activity record may identify the activity type, activity ID, date the activity was performed, and/or an observed/recorded time duration for the activity. The observed time duration represents an amount of time that was needed to complete the activity as measured and/or recorded by an administrator or other field resource. Each activity record represents a different instance of the activity that was performed and recorded on a different date and/or performed by different resources or people.

In general, the activity duration key is used to group similar activities and estimate the time duration of an activity based on properties of the activity. If the activity is, for example, installing a cable modem, various properties are associated with such an activity that represent what steps are performed and how long the steps take to perform. The steps may for example include travelling time, installing wires in a location, setting up the cable modem, installing software in the cable modem, resolving a specified problem, activating and testing the cable modem. Complexity of steps and experience level of a person performing the steps may also be factors to consider, which may affect a final estimated time that is calculated using the activity duration key.

Each activity may also have multiple activity duration keys that are configured to estimate the time duration differently based on different combinations of the activity properties that are considered in the calculations. Thus each activity duration key can designate different activities to be grouped together (as being similar) and generate a different time estimate for the group or same activity type.

The method of FIG. 1 describes a process for determining a quality of each activity duration key (based on historical data) to determine which key is most accurate in generating a time estimate for the activity. This allows the system to control, recommend, and/or select one of the duration keys to be used in future estimations of time for the activity type that will produce more accurate estimations as compared to the other duration keys. The process also determines and identifies which duration keys are inaccurate, which should not be used (e.g., should be deleted) and/or should be reconfigured.

In one embodiment, for each configured duration key, the system calculates the quality of the key based on how accurate the estimation of activity durations have been or would have been, if the respective key was used for the estimation calculations. This is done based on the following steps with reference to FIG. 1.

At 110, an activity duration key is selected for analysis. The activity duration key includes parameters that identifies which activities (activity types) are grouped by the key as being similar, and includes an estimated duration (activity key value) for each activity type. The estimated duration that is generated using the selected key is also called an activity key value, which represents an estimated amount of time for performing the activity type (e.g., an estimated duration is 35 minutes or some other time value). The activity types that are grouped by the duration key are identified and corresponding activity records are retrieved from a database or other data structure. The activity records include a time duration that was observed for performing the corresponding activity and recorded in the activity record.

At 120, the time durations reported for completed past activities are compared with the estimated duration for that activity using the key. A difference between the estimated duration and each reported time duration is determined. At 130, the difference is compared to a threshold value.

If the difference between the estimated time duration and reported time duration is less than the threshold value, the method goes to block 140 and the system designates the estimation for the corresponding activity record as being "good" or otherwise "accurate" (a good value). This means that the estimated time duration was close in value to the reported time duration. This also represents that the estimated duration from the duration key is accurate for the corresponding activity type of the activity record.

The quality is considered to deteriorate as the difference between the estimated time duration and reported time duration increases. If the difference is larger than the threshold value, the method goes to block 150 and the system designates the estimation as being "poor" or "bad" meaning the key is "inaccurate" for the respective activity type. In another embodiment, a third quality of "satisfactory" may be introduced that is defined between the good and poor values using a second threshold value.

When two thresholds are configured, three possible quality values are defined. For example, the quality value is determined based on the first threshold value and the second threshold, where the quality value for a selected activity record is assigned as: (i) the good value when the difference between the duration time of the activity duration key and the reported time duration for completing the selected activity from the selected activity record is between zero and the first threshold value; (ii) the satisfactory value when the difference is between the first threshold value and the second threshold value; and (iii) the bad value when the difference is greater than second threshold value. The quality value may be represented in terms of numbers or actual words, and represents a determined accuracy of the key for the corresponding activity record.

At 160, a final quality of the key is calculated based on the number or percentage of activity records that showed good, satisfactory, and bad/poor estimations relative to each other, for that duration key. The final quality can be converted to a number value, for example, between 0 and 5 where 0 is the lowest score (inaccurate key, or least accurate key for its activity types) and 5 is the best score (most accurate key for its activity types). Of course, other ranges for the final quality can be used, for example, by changing coefficients/weighting factors used in the calculation. This is described below.

The process is repeated for other duration keys and each key is assigned a quality value. When a quality value for multiple duration keys or all duration keys are determined, a list of keys and their quality values is generated. The duration key with the highest quality value is selected by the system. The selected duration key is determined by the system as the key that generates the most accurate time estimates for the corresponding set of activities that were grouped together as being similar.

The present determination and selection is based on actual reported data records and thus is more accurate than previous techniques that simply guessed which key was most accurate and which keys were inaccurate. Furthermore, since a duration key identifies its group of activities by coded parameters, it was not possible for a user (even when looking at the configuration of the key) to manually identify which corresponding activities actually matched the key. As such, the user could not find and retrieve the corresponding activity records. Thus a user could not determine the quality of a duration key based on historical records. Keep in mind as well that a typical database of activity records for a given organization may have tens of thousands to millions of activity records making the process impossible to do manually.

After the duration key with the highest quality is identified and selected, the system then generates a recommendation to use the selected key (rather than using the other keys). In one embodiment, the recommendation is created by generating a visual indication of the selected duration key on a display screen and/or transmitting the recommendation electronically, via a network, to a computing device for display to a selected user. The computing system includes at least one network interface for connecting to the network and communicating the recommendation over the network to a selected destination address or device to cause the recommended duration key to be activated and used in the system.

Figure 2:
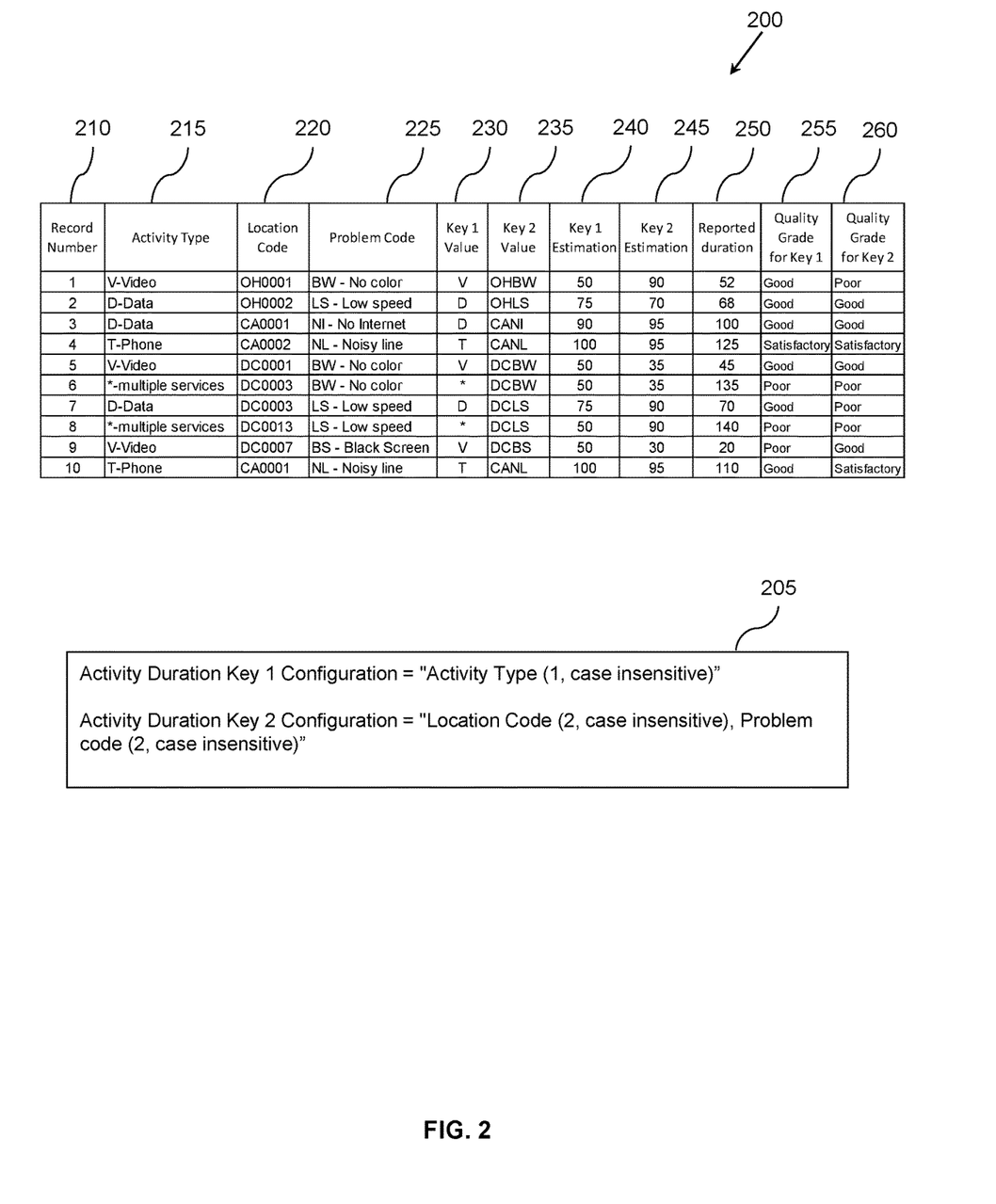
FIG. 2 illustrates an example table of activity records and duration key properties for determining key quality associated with FIG. 1.

With reference to FIG. 2, one embodiment of a graphical user interface is shown with a generated table 200 of key quality analysis and quality results that may be generated based on the method 100 of FIG. 1. The table 200 will be used to describe examples that correspond to the various functions of method 100. For the example table 200, two selected activity duration keys are shown in block 205, which may have been selected in block 105 from FIG. 1.

The table 200 shows ten (10) activity records identified by Record Number 210. Of course, there may be tens of thousands of activity records or more in a given system. Each activity record includes a number of properties, which in the example include activity type 215, location code 220, and problem code 225. Of course, there may be many more properties associated with an activity record but the three examples are chosen for simplicity and description purposes only.

The two keys being analyzed for quality are shown in block 205. Activity Duration Key 1 has a configuration of "Activity Type (1, case insensitive)". Activity Duration Key 2 has a configuration of "Location Code (2, case insensitive), Problem code (2, case insensitive)". The configuration is a grouping definition to identify and match which activities the key defines as similar. The configuration identifies properties from a plurality of activity types, which if they match, are to be grouped as similar activities. For key 1, the properties are "activity type" with the parameter of "1", which means select one (1) character (the first character) from the "activity type" and the case of the character is not relevant ("case insensitive"). A result of the Key 1 configuration is shown in a Key 1 Value 230 for each activity record. Looking at record number 1, the key value is "V" which is the first character taken from the "activity type" property 215 "V-Video".

For activity duration key 2, the configuration defines its key value as "Location Code (2, case insensitive), Problem code (2, case insensitive)." This code instructs the system to take the first two (2) characters from the Location Code, and take the first two (2) characters from the Problem Code. The resulting Key 2 Value is shown in column 235. Thus, for activity record 1, the Key 2 Value is "OHBW." This key value is then used to identify and match activity records, which are then grouped together as being similar activities (e.g., similar for time duration purposes). Key values are determined for the other activity records in a similar manner.

Activity records that have the same Key Values 230 or 235 (values that match) are considered similar activity types and are given the same estimated time duration for completing the activity based on the duration key. The estimated time duration for each similar activity type is shown in column Key 1 Estimation 240. For example, each activity record with a Key 1 Value of "V" has a Key 1 Estimation of "50" (e.g., 50 minutes or other time unit). Each activity record with a Key 2 Value of "CANL" has a Key 2 Estimation of "95" (e.g., 95 minutes or other time unit).

Thus each key configuration defines a group of similar activities based on selected properties defined in the key, and has an associated time duration estimate for completing the corresponding activities. Accordingly, each duration key may generate a different time estimate for the same activity since each key uses different properties. As seen in table 200, for activity record 1, Key 1 has an estimation of 50 and Key 2 has an estimation of 90. The time duration estimate may be generated based on various factors and/or formulas, which are not the subject of this disclosure. Rather, the present system is directed to determining the quality of the key and its estimates that have been previously generated.

As shown in block 120 of FIG. 1, to determine a quality for each activity duration key, the system compares the estimated duration time of the activity duration key (Key 1 Estimation, and Key 2 Estimation) to each reported time duration for completing the selected activity from each of the activity records. The reported time duration for each activity record is shown in column 250. The activity records represent past performances of the selected activity (e.g., historical performance records) and how long it took to actually complete the activity. A difference between the estimated duration and the reported duration is determined (e.g., by the processor accessing, retrieving, and comparing data values from a memory).

The system assigns a quality value to each activity record based on the difference as compared to a threshold value (as previously stated with reference to block 130 of FIG. 1). In FIG. 2, the quality value represents one of at least three accuracy values indicative of a good value, satisfactory value, or a poor value. Thus two threshold values are used in the example. A resulting quality value is shown for Key 1 in column 255 as "Quality Grade for Key 1" and for Key 2 is shown in column 260 as "Quality Grade for Key 2." In another embodiment, any number of threshold values may be used to define multiple levels of accuracy values.

As stated previously (block 160 in FIG. 1), the system calculates the quality of the activity duration key based at least on a number of the activity records that were assigned the good value relative to a number of the activity records assigned the satisfactory value, and the poor value. In the example, for Key 1, 6 records are "good" (equals 60%), 1 record is "satisfactory" (equals 10%), and 3 records are "poor" (equals 30%) out of a total of 10 records.

In one embodiment, the final quality of a key is calculated based on the following formula based on total number of record counts and weighted value given to each value of good, satisfactory, and bad:

Final Quality of Key 1=(6*% of Good Estimations)+
(4*% of Satisfactory Estimations).

Hence, based on the data from table 200 in FIG. 2 and the number of records with good and satisfactory scores out of the total number of ten records, the quality of Key 1=(6*60% good)+(4*10% satisfactory)=(6*0.6)+(4*0.1) =4.0. This is one example of how the quality value based on the number of activity records with the same quality value are combined to determine the final quality for the key.

The process is repeated for the other duration keys. The final quality of Key 2=(6*40% good)+(4*20% satisfactory) =3.2. Of course, other coefficients/weighting factors can be used instead of 6 and 4 in order to scale the final value to different ranges. Thus the coefficients of 6 and 4 are for illustrative purposes. In one embodiment, the final value may be limited to a selected maximum value, for example, 5. Thus, if the quality value is calculated as a value higher than 5, the final value is set at 5 so that all final values fall within a defined range of 0 to 5.

The percentage of "bad" records (inaccurate time estimate and/or grouping definition) is not directly shown in the formula. However, it is factored into the formula since the percentages of "good" and "satisfactory" records relative to the total number of records changes due to the number of "bad" records.

After all the duration keys are analyzed and graded, the system identifies and selects a candidate duration key based on the quality for each of the duration keys. In this example, Key 1 has the highest score and thus is considered to be more accurate than Key 2. The system selects Key 1 and generates a recommendation indicating Key 1. The recommendation is displayed on a display to recommend the candidate duration key for use in estimating a time duration for completing the selected activity type in future calculations.

Thus the system may control the selection and application of duration keys by recommending the most accurate key for future use. This allows the system to control subsequent estimations for a group of activity types by "activating" and applying the candidate duration key to estimate future time durations for the group of activity types.

In some instances, the quality determination may result in determining that all duration keys have a low quality score, meaning that the duration keys are inaccurate. The recommendation may also include an instruction to delete or reconfigure an inaccurate duration key. The instruction may be an instruction to configure a new duration key in order to improve quality of the time estimations for future activities and/or change the grouping definition of activities that are defined as similar. The recommendation may then be transmitted electronically to one or more selected recipients to their remote devices to notify them of the recommendation (via a message and/or a displayed notice).

Since the key configuration is a grouping definition used to identify which activities are grouped as "similar," the quality of the duration key is affected by how well the grouping definition matches activities. For example, the configuration of activity duration key 1 has a grouping definition that selects the first character from the "Activity Type" property (see block 205 and column 230 in FIG. 2). The activity types that start with "V" (e.g., "V-Video") are thus grouped as similar because their first character matches.

However if another activity type exists with the type "VoIP-Voice" (Voice over IP), this would also match the definition and be grouped as similar with "V-Video" even though these activities may not be similar. If the Reported Durations 250 for the "VoIP-Voice" records are very different from the Reported Durations of the "V-Video" records, this would result in many more "poor" quality estimations because the estimated times would not be similar. Thus the final quality grade for the key may result as a "poor" quality. This would then be identified by the system and a notification may be generated and displayed/transmitted to a device to cause a reevaluation of the configuration of the key and to redefine the grouping definition.

The computation of the qualities of all configured keys (irrespective of whether they were active or not) provides a very clear picture on how good each configured key is. Customers can then make an informed decision (backed by data) on which key should be used for activity duration estimations.

In one embodiment, the present key quality system is a computing/data processing system including an application or collection of distributed applications for enterprise organizations. The applications and computing system may be configured to operate with or be implemented as a cloud-based networking system, a software as a service (SaaS) architecture, or other type of networked computing solution. In one embodiment, the present key quality system is a centralized server-side application that provides at least the functions disclosed herein and that is accessed by many users via computing devices/terminals communicating with the computing system (functioning as the server) over a computer network.

In one embodiment, the key quality system is configured as a module for execution on a computing system to perform the method of FIG. 1 and equivalents. The key quality module is configured as one or more program modules stored in a non-transitory computer readable medium. The program modules are configured with stored instructions that when executed by at least a processor cause the computing device to perform the corresponding function(s) as described herein.

Computing Device Embodiment

Figure 3:
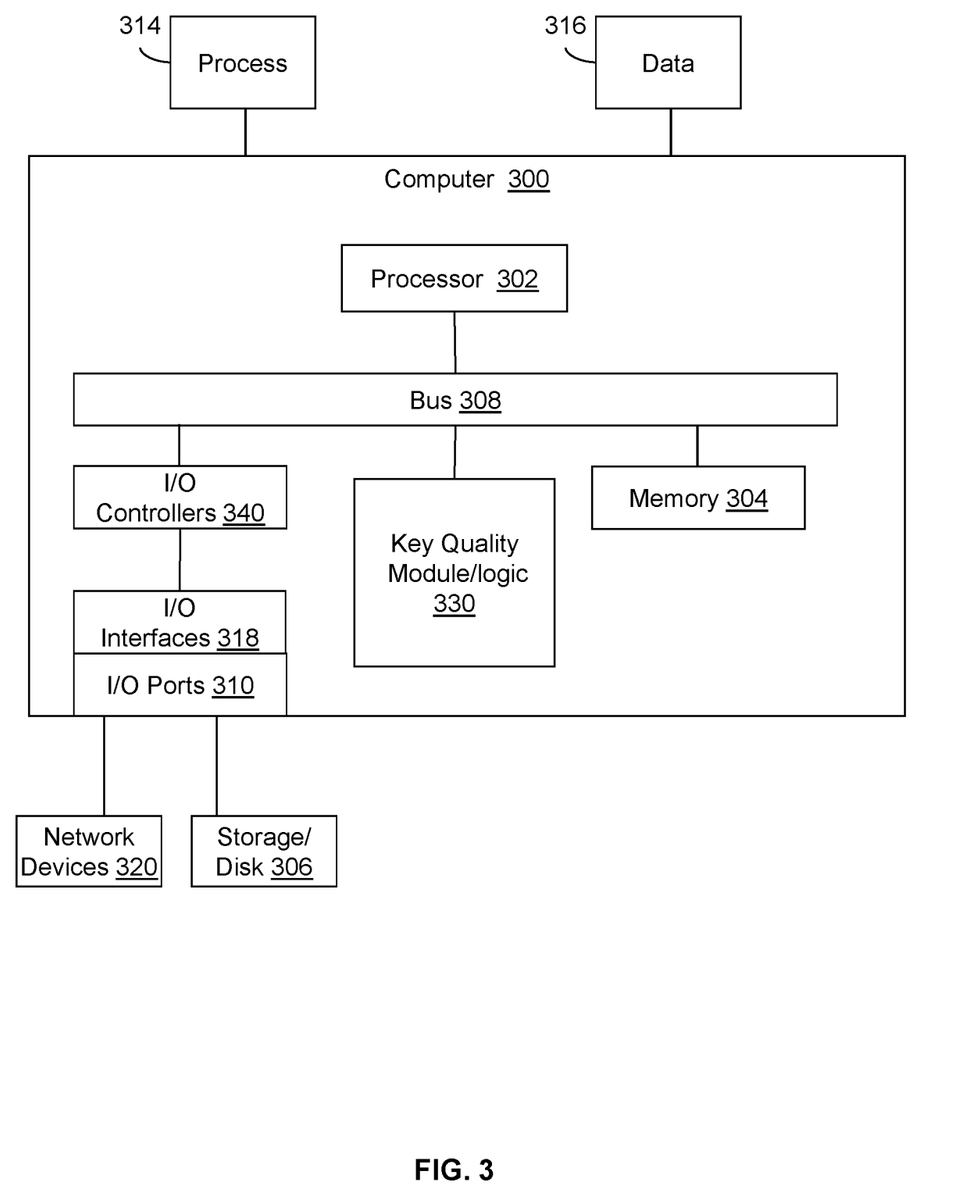
FIG. 3 illustrates an embodiment of a special purpose computing system configured with the example systems and/or methods disclosed.

FIG. 3 illustrates an example special purpose computing device that is configured and/or programmed with one or more of the example systems and methods described herein, and/or equivalents. The example computing device may be a computer 300 that includes a processor 302, a memory 304, and input/output ports 310 operably connected by a bus 308. In one example, the computer 300 may include a key quality module/logic 330 configured to facilitate key quality analysis and generate recommendations as performed by the method of FIG. 1 and FIG. 2. In different examples, the logic 330 may be implemented in hardware, a non-transitory computer-readable medium with stored instructions, firmware, and/or combinations thereof. While the logic 330 is illustrated as a hardware component attached to the bus 308, it is to be appreciated that in other embodiments, the logic 330 could be implemented in the processor 302, stored in memory 304, or stored in disk 306.

In one embodiment, logic 330 or the computer is a means (e.g., structure: hardware, non-transitory computer-readable medium, firmware) for performing the actions described. In some embodiments, the computing device may be a special purpose server operating in a cloud computing system, a server configured in a Software as a Service (SaaS) architecture, a smart phone, laptop, tablet computing device, and so on.

Describing an example configuration of the computer 300, the processor 302 may be a variety of various specially programmed processors including dual microprocessor and other multi-processor architectures. A memory 304 may include volatile memory and/or non-volatile memory. Non-volatile memory may include, for example, ROM, PROM, and so on. Volatile memory may include, for example, RAM, SRAM, DRAM, and so on.

A storage disk 306 may be operably connected to the computer 300 via, for example, an input/output (I/O) interface (e.g., card, device) 318 and an input/output port 310. The disk 306 may be, for example, a magnetic disk drive, a solid state disk drive, a floppy disk drive, a tape drive, a Zip drive, a flash memory card, a memory stick, and so on. Furthermore, the disk 306 may be a CD-ROM drive, a CD-R drive, a CD-RW drive, a DVD ROM, and so on. The memory 304 can store a process 314 and/or a data 316, for example. The disk 306 and/or the memory 304 can store an operating system that controls and allocates resources of the computer 300.

The computer 300 may interact with input/output (I/O) devices via the I/O interfaces 318 and the input/output ports 310. Input/output devices may be, for example, a keyboard, a microphone, a pointing and selection device, cameras, video cards, displays, the disk 306, the network devices 320, and so on. The input/output ports 310 may include, for example, serial ports, parallel ports, and USB ports.

The computer 300 can operate in a network environment and thus may be connected to the network devices 320 via the I/O interfaces 318, and/or the I/O ports 310. Through the network devices 320, the computer 300 may interact with a network. Through the network, the computer 300 may be logically connected to remote computers. Networks with which the computer 300 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101. It is inconsistent with the present disclosure to interpret that any of the functions performed and/or claimed herein can be performed in the human mind or manually.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor specially programmed with an algorithm for performing the disclosed methods, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by at least a processor of a computer cause the computer to:
    select an activity duration key from a plurality of duration keys, wherein the activity duration key (i) identifies a plurality of activity types to be grouped as similar activities, and (ii) includes an estimated duration time for each of the activity types that is a time estimated to complete a respective activity type;
    retrieve, from a database, a set of activity records associated with the plurality of activity types identified by the activity duration key, wherein each activity record identifies a reported time duration for completing a corresponding activity in a past event;
    determine a quality for the activity duration key from the plurality of duration keys, comprising:
        comparing the duration time of the activity duration key to each reported time duration for completing the selected activity from each of the activity records and determining a difference associated to each activity record;
        assigning a quality value to each activity record based on the difference, wherein the quality value represents one of at least two values indicative of a good value or a bad value;
        wherein the quality value is determined based on at least a first threshold value;
        wherein the quality value for a selected activity record is assigned as:
            (i) the good value when the difference between the duration time of the activity duration key and the reported time duration for completing the selected activity from the selected activity record is less than the first threshold value; and
            (ii) the bad value when the difference is greater than the first threshold value; and
        calculating the quality of the activity duration key based at least on a number of the activity records that were assigned the good value relative to a number of the activity records assigned the bad value;
    repeat the determining of the quality for each of the duration keys;
    based on the quality for each of the duration keys, select a candidate duration key; and
    generate a graphical user interface on a display screen and generate a visual indication on the graphical user interface to display a recommendation on the display screen to recommend the candidate duration key for use in estimating a time duration for completing the selected activity type in future calculations.

2. The non-transitory computer-readable medium of claim 1, wherein the instructions to retrieve the set of activity records includes instructions to cause the processor to access at least one memory to retrieve one or more records of the set of activity records.

3. The non-transitory computer-readable medium of claim 1, further comprising instructions that when executed by at least the processor cause the processor to determine the difference and the quality value based on a threshold value by the processor accessing at least one memory to read and to compare the duration time to each reported time duration.

4. The non-transitory computer-readable medium of claim 1, wherein the instructions for assigning the quality value to each activity record including the at least two values includes assigning an additional value indicative of a satisfactory value; and
  wherein the quality value is determined based on the first threshold value and a second threshold;
  wherein the quality value for the selected activity record is assigned as:
    (i) the good value when the difference between the duration time of the activity duration key and the reported time duration for completing the selected activity from the selected activity record is between zero and the first threshold value;
    (ii) the satisfactory value when the difference is between the first threshold value and the second threshold value; and
    (iii) the bad value when the difference is greater than second threshold value.

5. The non-transitory computer-readable medium of claim 1, further comprising instructions that when executed by at least the processor cause the processor to control subsequent estimations for the selected activity type by applying the candidate duration key to estimate a future time duration for the selected activity type.

6. A computing system, comprising:
  at least one processor connected to at least one memory;
  a key quality module stored on a non-transitory computer readable medium and including instructions that when executed by at least the processor cause the processor to:
  determine a quality for an activity duration key from a plurality of duration keys, wherein the activity duration key includes an estimated duration time for each of the activity types, the determining comprising:
    retrieving, from a database, a set of activity records associated with the plurality of activity types, wherein each activity record identifies a reported time duration for completing a corresponding activity in a past event;
    comparing the duration time of the activity duration key to each reported time duration for completing the selected activity from each of the activity records and determining a difference associated to each activity record;
    assigning a quality value to each activity record based on the difference, wherein the quality value represents one of at least two values indicative of a good value or a bad value;
    wherein the quality value is determined based on at least a first threshold value;
    wherein the quality value for a selected activity record is assigned as:
      (i) the good value when the difference between the duration time of the activity duration key and the reported time duration for completing the selected activity from the selected activity record is less than the first threshold value; and
      (ii) the bad value when the difference is greater than the first threshold value; and
    combining a number of the activity records that were assigned a same quality value relative to a number of the activity records assigned a different quality value to determine the quality of a respective duration key;
  based on the quality for each of the duration keys, select a candidate duration key; and
  generate a graphical user interface on a display screen and generate a visual indication on the graphical user interface that identifies a recommendation for the candidate duration key.

7. The computing system of claim 6, wherein the instructions to retrieve the set of activity records includes instructions to cause the processor to access at least one memory to retrieve one or more records of the set of activity records.

8. The computing system of claim 6, further comprising instructions that when executed by at least the processor cause the processor to determine the difference and the quality value based on a threshold value.

9. The computing system of claim 6, wherein the instructions for combining the number of activity records includes calculating the quality of the activity duration key based at least on a number of the activity records that were assigned the good value relative to a number of the activity records assigned the bad value.

10. The computing system of claim 6, wherein the instructions for assigning the quality value to each activity record including the at least two values includes assigning an additional value indicative of a satisfactory value; and
  wherein the quality value is determined based on the first threshold value and a second threshold;
  wherein the quality value for the selected activity record is assigned as:
    (i) the good value when the difference between the duration time of the activity duration key and the reported time duration for completing the selected activity from the selected activity record is between zero and the first threshold value;
    (ii) the satisfactory value when the difference is between the first threshold value and the second threshold value; and
    (iii) the bad value when the difference is greater than second threshold value.

11. The computing system of claim 6, further comprising instructions that when executed by at least the processor cause the processor to control subsequent estimations for the selected activity type by applying the candidate duration key to estimate a future time duration for the selected activity type.

12. The computing system of claim 6, further comprising at least one network interface configured to connect to a network, wherein the computing system is implemented in a cloud-based system.

13. A computer-implemented method, the method comprising:
  selecting, by at least a processor accessing one or more memories, an activity duration key from a plurality of duration keys, wherein the activity duration key (i) identifies a plurality of activity types to be grouped as similar activities, and (ii) includes an estimated duration time for each of the activity types that is a time estimated to complete a respective activity type;
  retrieving, by at least the processor accessing the one or more memories, a set of activity records associated with the plurality of activity types identified by the activity duration key, wherein each activity record identifies a reported time duration for completing a corresponding activity in a past event;
  determining, by at least the processor accessing one of the memories, a quality for the activity duration key from the plurality of duration keys, comprising:
    comparing, by at least the processor accessing one or the memories, the duration time of the activity duration key to each reported time duration for completing the selected activity from each of the activity records and determining a difference associated to each activity record;

assigning, by at least the processor accessing one of the memories, a quality value to each activity record based on the difference, wherein the quality value represents one of at least two values indicative of a good value or a bad value;

wherein the quality value is determined based on at least a first threshold value;

wherein the quality value for a selected activity record is assigned as:
(i) the good value when the difference between the duration time of the activity duration key and the reported time duration for completing the selected activity from the selected activity record is less than the first threshold value; and
(ii) the bad value when the difference is greater than the first threshold value; and calculating, by at least the processor accessing one of the memories, the quality of the activity duration key based at least on a number of the activity records that were assigned the good value relative to a number of the activity records assigned the bad value;

repeat the determining of the quality for each of the duration keys;

based on the quality for each of the duration keys, select a candidate duration key; and generate a graphical user interface on a display screen and generate a visual indication on the graphical user interface to display a recommendation on the display screen to recommend the candidate duration key for use in estimating a time duration for completing the selected activity type in future calculations.

14. The computer-implemented method of claim 13, wherein retrieving the set of activity records includes the processor accessing at least one memory to retrieve one or more records of the set of activity records.

15. The computer-implemented method of claim 13, wherein determining the difference and the quality value is determined based on a threshold value.

16. The computer-implemented method of claim 13, wherein calculating the quality of the activity duration key includes combining the number of the activity records that were assigned a same quality value relative to a number of the activity records assigned a different quality value to determine the quality of a respective duration key.

17. The computer-implemented method of claim 13, wherein assigning the quality value to each activity record includes defining an additional value indicative of a satisfactory value; and
determining the quality value is based on the first threshold value and a second threshold;
wherein the quality value for the selected activity record is assigned as:
(i) the good value when the difference between the duration time of the activity duration key and the reported time duration for completing the selected activity from the selected activity record is between zero and the first threshold value;
(ii) the satisfactory value when the difference is between the first threshold value and the second threshold value; and
(iii) the bad value when the difference is greater than second threshold value.

18. The computer-implemented method of claim 13, further comprising controlling subsequent estimations for the selected activity type by applying the candidate duration key to estimate a future time duration for the selected activity type.

19. The computer-implemented method of claim 13, further comprising transmitting the recommendation electronically via at least one network interface over a network.

20. The computer-implemented method of claim 13, further comprising
based on the quality for each of the duration keys, select an inaccurate candidate duration key that is identified as an inaccurate key; and
generate and display a second recommendation on the display to identify and recommend that the inaccurate candidate duration key be reconfigured.

* * * * *